(12) United States Patent
Roberts et al.

(10) Patent No.: US 8,327,404 B2
(45) Date of Patent: Dec. 4, 2012

(54) METHODS AND SYSTEMS FOR PROVIDING ENHANCED CONTENT ASSOCIATED WITH A MEDIA CONTENT INSTANCE AVAILABLE FOR PURCHASE

(75) Inventors: Brian F. Roberts, Dallas, TX (US); Siddharth Pandey, Irving, TX (US); Enrique Ruiz-Velasco, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 101 days.

(21) Appl. No.: 12/634,012

(22) Filed: Dec. 9, 2009

(65) Prior Publication Data

US 2011/0138412 A1    Jun. 9, 2011

(51) Int. Cl.
*G06F 3/00* (2006.01)
*G06F 13/00* (2006.01)
*H04N 5/445* (2011.01)

(52) U.S. Cl. ............... 725/61; 725/44; 725/48; 725/60; 725/87; 725/104; 725/120

(58) Field of Classification Search .................. 725/44, 725/48, 60, 61, 87, 104, 120
See application file for complete search history.

(56) References Cited

U.S. PATENT DOCUMENTS

| | | | |
|---|---|---|---|
| 7,793,326 B2* | 9/2010 | McCoskey et al. | 725/91 |
| 2002/0184629 A1* | 12/2002 | Sie et al. | 725/41 |
| 2008/0066111 A1* | 3/2008 | Ellis et al. | 725/57 |
| 2008/0092181 A1* | 4/2008 | Britt | 725/87 |
| 2008/0098450 A1* | 4/2008 | Wu et al. | 725/132 |
| 2010/0080163 A1* | 4/2010 | Krishnamoorthi et al. | 370/312 |
| 2010/0269130 A1* | 10/2010 | Gupta | 725/28 |

* cited by examiner

*Primary Examiner* — Pankaj Kumar
*Assistant Examiner* — Charles N Hicks

(57) ABSTRACT

An exemplary method includes presenting, by a media content delivery system, an advertisement for a media content instance that is accessible only at or after a scheduled release time, receiving, by the media content delivery system, a request input by a user to purchase access to the media content instance, and providing, by the media content delivery system in response to the received request, enhanced content associated with the media content instance for experiencing by the user before the scheduled release time. Corresponding methods and systems are also disclosed.

20 Claims, 15 Drawing Sheets

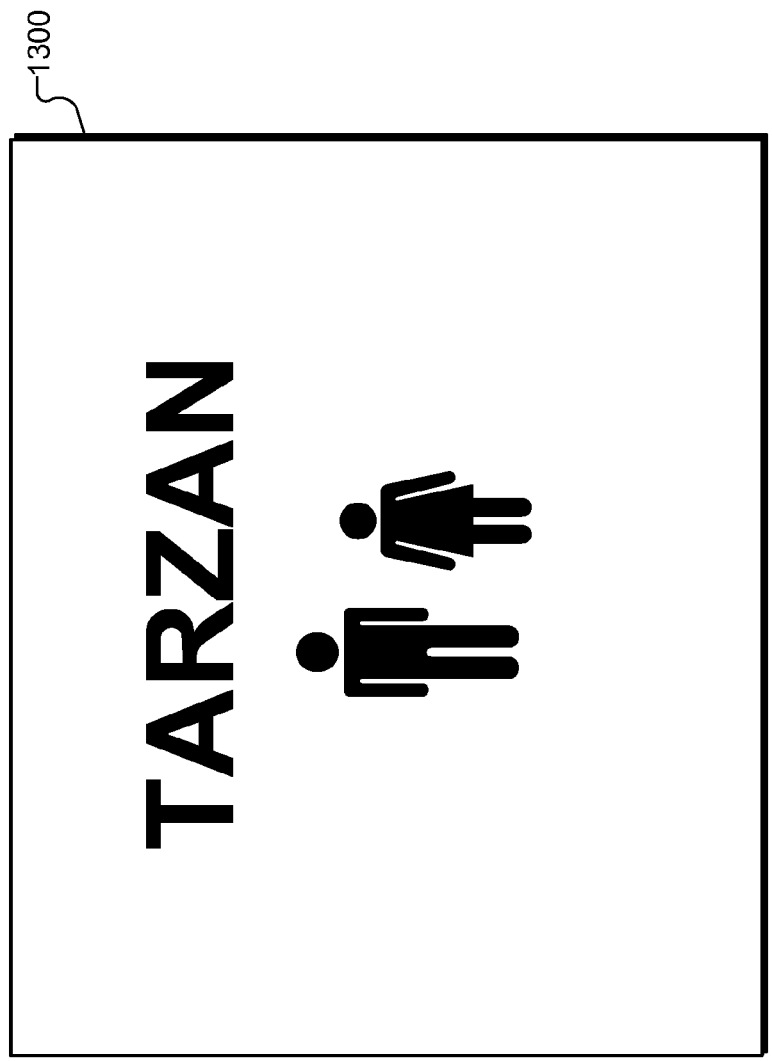
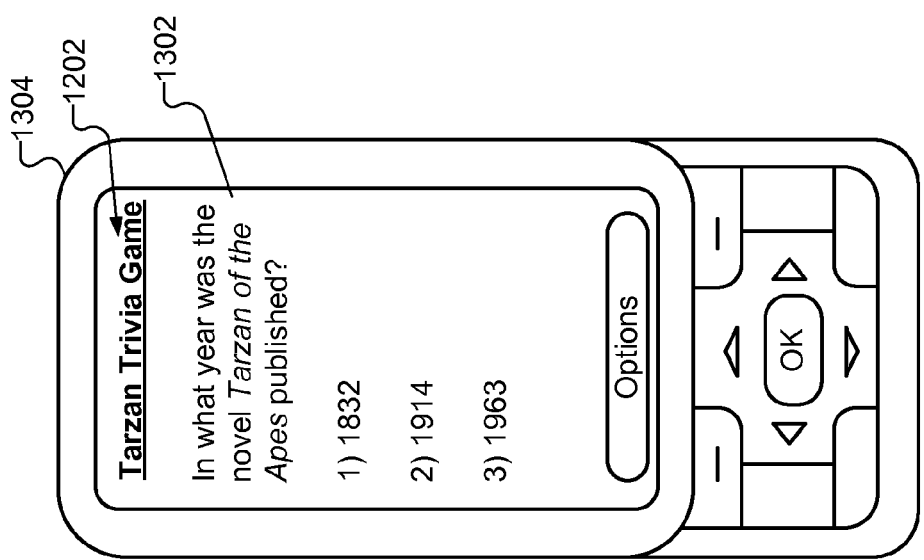
Fig. 13

METHODS AND SYSTEMS FOR PROVIDING ENHANCED CONTENT ASSOCIATED WITH A MEDIA CONTENT INSTANCE AVAILABLE FOR PURCHASE

BACKGROUND INFORMATION

Set-top box devices and other media content access devices are often capable of allowing users to purchase access to a variety of different media content instances. For example, a user may purchase access to a pay-per-view event, a video-on-demand program, a movie, music, and/or any other type of media content instance available by way of a media content access device.

Because such media content instances are transmitted to a media content access device by way of some type of network (e.g., a subscriber television network), a user may experience a media content instance almost immediately upon purchase thereof. Hence, users currently do not have any incentive to pre-order a media content instance scheduled for broadcast or release at a future date (e.g., a pay-per-view event, a movie, etc.).

Moreover, traditional broadcast advertisements for such media content instances are limited to a relatively short amount of time to generate user interest in the media content instances. For example, it is sometimes difficult to generate user interest in a pay-per-view event or a movie scheduled for release during thirty second advertisements slots. Hence, alternative approaches to promoting and incentivizing pre-ordering of media content instances available for purchase are desirable.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 13 illustrates an exemplary configuration wherein a media content instance and enhanced content associated with the media content instance are concurrently displayed on distinct display screens according to principles described herein.

DETAILED DESCRIPTION OF PREFERRED EMBODIMENTS

Figure 1:
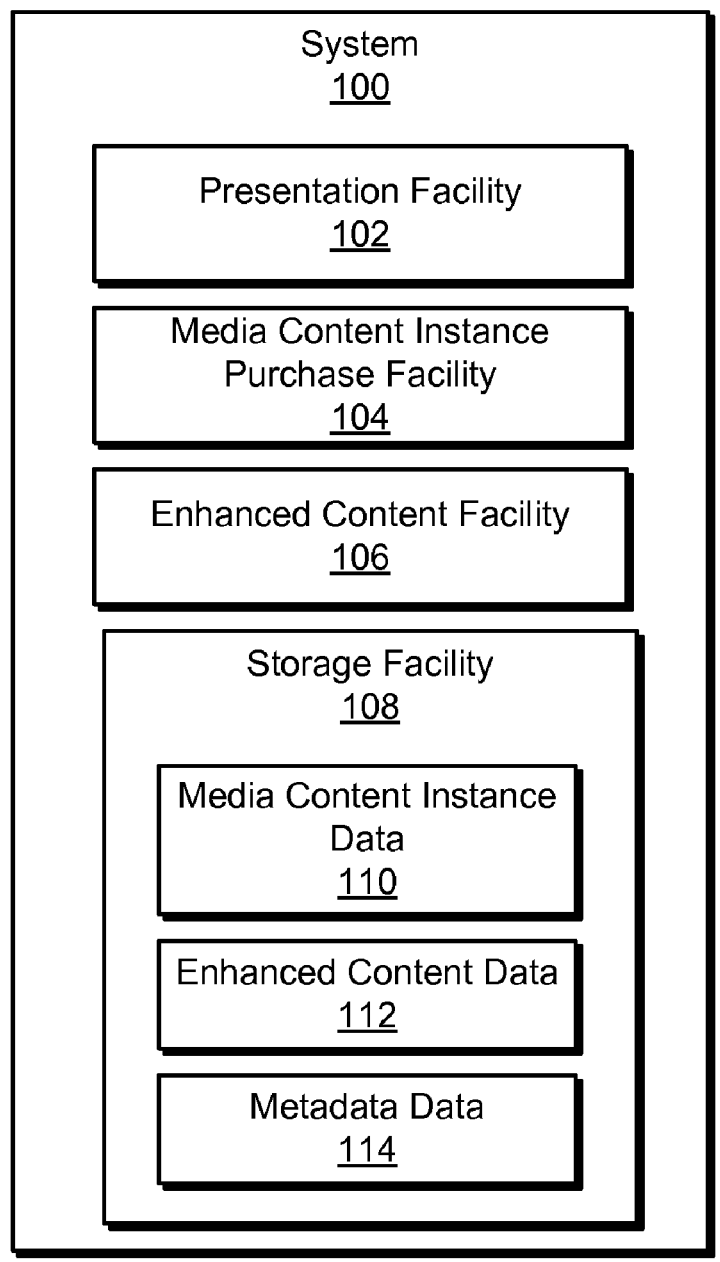
FIG. 1 illustrates an exemplary media content delivery system according to principles described herein.

Exemplary methods and systems for providing enhanced content associated with a media content instance available for purchase are described herein. As described in more detail below, an advertisement for a media content instance available for purchase and accessible only at or after a scheduled release time may be presented to a user. A request input by the user to purchase access to the media content instance may be received and processed. In response to the received purchase request, enhanced content associated with the media content instance may be provided for experiencing by the user before the scheduled release time. The enhanced content may be additionally accessed at or after the release time of the media content instance.

Allowing a user to access enhanced content before a release date of a media content instance may result in a user having a more fulfilling and enjoyable experience with a purchased media content instance. Moreover, enhanced content may incentivize users to pre-order access to a media content instance available for purchase, motivate users to purchase a media content instance through a particular content provider (e.g., through a subscriber television provider as opposed to through an online or retail store), and allow producers of media content instances available for purchase to promote and/or gauge interest in the media content instances.

As used herein, "media content" may refer generally to any content accessible via a media content access subsystem. The term "media content instance" will be used herein to refer to any television program, on-demand media program (e.g., video-on-demand program), pay-per-view event, broadcast media program (e.g., broadcast television program), multicast media program, narrowcast media program, IPTV media content, video, movie, song, video game, or combination of these or other forms of media content that may be viewed or otherwise experienced by a user.

As used herein, a "scheduled release time" of a media content instance refers to a particular time in the future at which the media content instance becomes available for access by one or more users. For example, a scheduled release time may refer to a broadcast time of a pay-per-view event, a date and time at which a new movie becomes available, and/or any other time at which a media content instance becomes available for access by one or more users.

As used herein, "enhanced content" refers to any content associated with a purchased media content instance that may be of interest to a user. For example, enhanced content may include, but is not limited to, social networking content associated with the purchased media content instance, Internet-based content associated with the purchased media content instance, content associated with personnel associated with the purchased media content instance, rating content associated with the purchased media content instance, one or more scenes included within the purchased media content instance, production content associated with the purchased media content instance, one or more scenes deleted from the purchased media content instance, one or more alternative scenes associated with the purchased media content instance, trivia associated with the purchased media content instance, one or more advertisements for one or more objects associated with the purchased media content instance, one or more platform-specific formats of the purchased media content instance, and/or any other content associated with a purchased media content instance and that may be accessed by a user.

FIG. 1 illustrates an exemplary media content delivery system 100 (or simply "system 100"). As will be described in more detail below, system 100 may be configured to facilitate presentation of enhanced content associated with a purchased media content instance to a user of a media content access subsystem (e.g., a set-top box device). System 100 may include, but is not limited to, a presentation facility 102, a media content instance purchase facility 104, an enhanced content facility 106, and a storage facility 108. Each of these facilities will now be described in more detail.

Presentation facility 102 may be configured to present media content for experiencing by a user. A presentation of media content may be performed in any suitable way such as by generating and/or providing output signals representative of media content to a display device (e.g., a television) and/or an audio output device. For example, presentation facility 102 may display, play, or otherwise present a purchased media content instance, an advertisement, and/or any other type of media content instance for experiencing by a user.

To illustrate, presentation facility 102 may be configured to present an advertisement for a media content instance that is accessible only at or after a scheduled release time. The advertisement may be included within a broadcast advertisement stream that is presented to the user. Alternatively, the advertisement may be included within a listing of available media content instances for purchase displayed by system 100. Presentation facility 102 may be further configured to present or otherwise provide access to the advertised media content instance at and/or after the scheduled release time in response to a user purchasing access to the media content instance.

Media content instance purchase facility 104 may be configured to facilitate purchase of access to a media content instance by a user. For example, media content instance purchase facility 104 may receive a request input by a user to purchase access to a media content instance (e.g., a pay-per-view event, a movie, etc.), process the request in order to validate the purchase transaction, and provide access to the media content instance upon completion of the purchase. To this end, media content instance purchase facility 104 may be configured to maintain and/or be integrated with a purchase account associated with a user (e.g., a subscriber television service account, a mobile phone service account, and/or any other account to which a purchase price associated with the media content instance may be charged. Once the purchase of the media content instance has been completed, media content instance purchase facility 104 may provide access to the media content instance at or after a scheduled release time of the media content instance.

Enhanced content facility 106 may be configured to provide enhanced content associated with a purchased media content instance for experiencing by the user. As described above, enhanced content refers to any content associated with a purchased media content instance that may be of interest to a user.

To illustrate, enhanced content may include social networking content. Exemplary social networking content includes, but is not limited to, chat rooms, message boards, and links to social networking websites (e.g., Facebook, Twitter, etc.) that are associated with the purchased media content instance.

Enhanced content may additionally or alternatively include Internet-based content. Exemplary Internet-based content may include hyperlinks to online content (e.g., news) associated with the purchased media content instance, blogs, and/or any other Internet-based content as may serve a particular application.

Enhanced content may additionally or alternatively include content associated with personnel associated with the purchased media content instance. For example, the enhanced content may include bios, interviews, and/or chats with actors, directors, producers, and/or any other personnel associated with the purchased media content instance. The enhanced content may further include listings of other media content instances (e.g., movies) associated with the personnel, video clips in which the personnel appear, etc.

Enhanced content may additionally or alternatively include rating content associated with the purchased media content instance. For example, the enhanced content may be configured to facilitate a user rating of the purchased media content instance and/or scenes thereof in order to obtain user feedback regarding the purchased media content instance. The rating content may be provided to a content provider and/or other users as may serve a particular application.

Enhanced content may additionally or alternatively include one or more scenes included within or otherwise associated with the purchased media content instance. For example, the enhanced content may provide a user with the ability to view exclusive trailers, still shots, and/or other scenes included within the purchased media content instance before they are publicly available to the general population. The enhanced content may additionally or alternatively provide access to alternative or deleted scenes associated with the purchased media content instance.

Enhanced content may additionally or alternatively include production content associated with the purchased media content instance. For example, the enhanced content may provide a user with the ability to view or otherwise access exclusive footage from the production of the purchased media content instance and/or to track how the production of the purchased media content instance is progressing.

Enhanced content may additionally or alternatively include trivia associated with the purchased media content instance. For example, the enhanced content may provide a user with the ability to play an interactive trivia game associated with the purchased media content instance or otherwise access trivia associated with the purchased media content instance.

Enhanced content may additionally or alternatively include one or more advertisements for one or more objects associated with the purchased media content instance. For example, various options to purchase items associated with the media content instance (e.g., souvenirs, clothing, and/or products featured in the purchased media content instance) may be presented to a user as enhanced content. Additionally or alternatively, links to local classifieds, local events, local news, or other local content associated with the media content instance may be presented to the user as enhanced content.

Enhanced content may additionally or alternatively include one or more platform-specific formats of the purchased media content instance. For example, the enhanced content may include alternative resolution versions of the purchased media content instance suitable for different types of access devices.

The aforementioned examples of enhanced content are merely illustrative of the many different types of enhanced content that may be associated with a purchased media content instance. It will be recognized that additional or alternative types of enhanced content may be provided by enhanced content facility 106 as may serve a particular application.

In some examples, as will be described in more detail below, enhanced content may be provided before the scheduled release time of the corresponding media content instance so that the user may experience the enhanced content before the scheduled release time.

Enhanced content facility 106 may be further configured to provide access to the enhanced content at or after the scheduled release time of the corresponding media content instance. For example, enhanced content facility 106 may provide access to the enhanced content concurrently with a presentation of the media content instance.

Enhanced content facility 106 may be configured to dynamically update and/or select the enhanced content based on an interaction of the user with the enhanced content. For example, enhanced content facility 106 may be configured to increase an amount of enhanced content available to the user in response to a predetermined amount of interaction by the user with the enhanced content. Enhanced content facility 106 may be further configured to update and/or select the enhanced content in accordance with a current time in relation to the release time of the media content instance, a user profile associated with the user, a mood of the user, and/or any other factor as may serve a particular application.

In some examples, enhanced content facility 106 may be configured to provide an interactive portal configured to facilitate interaction by the user with the enhanced content. The interactive portal may be displayed on a display screen associated with an access device (e.g., on a display screen of a television associated with a set-top box device, on a display screen of a mobile phone device, and/or on any other display screen as may serve a particular application).

As will be described in more detail below, enhanced content facility 106 may provide one or more application programming interfaces ("APIs") configured to facilitate customization of the interactive portal to a vendor associated with the media content instance and/or the enhanced content. The vendor may utilize the APIs to provide input configured to customize the interactive portal. For example, the vendor may select the enhanced content to be included within the interactive portal, modify an appearance of the interactive portal, and/or otherwise customize the interactive portal as may serve a particular application. In this manner, the vendor does not have to rely on personnel associated with the provider-specific network to provide or make available the enhanced content to be presented to a user.

Enhanced content facility 106 may additionally or alternatively be configured to automatically customize the interactive portal. For example, enhanced content facility 106 may automatically select enhanced content to be included within the interactive portal, modify an appearance of the interactive portal, and/or otherwise customize the interactive portal in accordance with the associated media content instance, a user profile associated with a user, and/or any other factor as may serve a particular application.

Storage facility 108 may be configured to maintain media content instance data 110 representative of one or more media content instances accessible via system 100, enhanced content data 112 representative of enhanced content associated with one or more purchased media content instances, and metadata data 114 representative of metadata associated with media content instance data 110 and/or enhanced content data 112. It will be recognized that storage facility 108 may maintain additional or alternative data as may serve a particular application.

System 100, including facilities 102-108, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices, and may employ any of a number of computer operating systems. Moreover, it will be recognized that although facilities 102-108 are shown to be separate facilities in FIG. 1, any of those facilities may be combined into a single facility as may serve a particular application.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Figure 2:
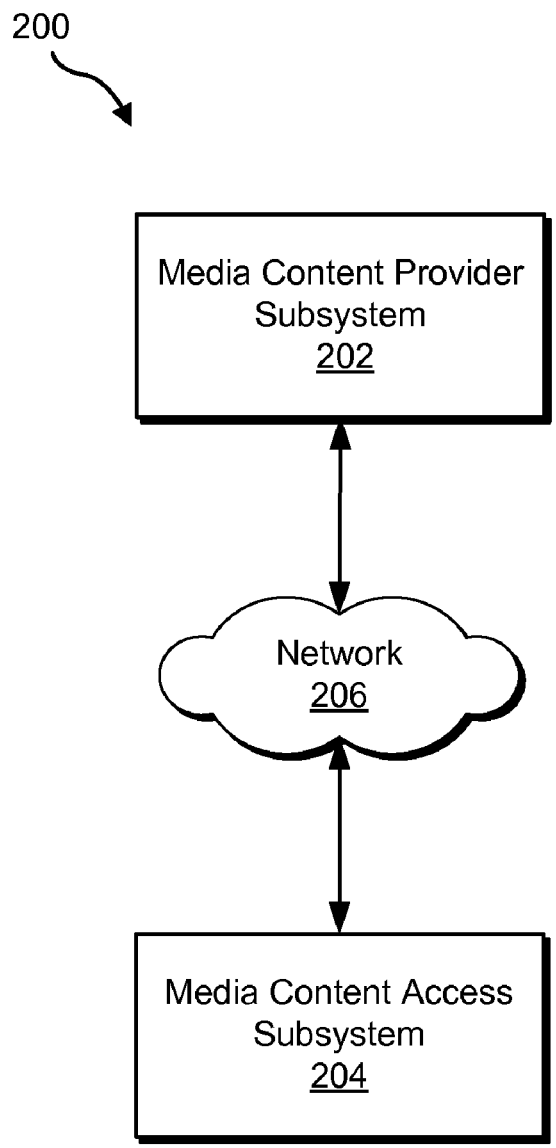
FIG. 2 illustrates an exemplary implementation of the system of FIG. 1 according to principles described herein.

FIG. 2 illustrates an exemplary implementation 200 of system 100 wherein a media content provider subsystem 202 (or simply "provider subsystem 202") is communicatively coupled to a media content access subsystem 204 (or simply "access subsystem 204"). As will be described in more detail below, presentation facility 102, media content instance purchase facility 104, enhanced content facility 106, and storage facility 108 may each be implemented on one or both of provider subsystem 202 and access subsystem 204.

Access subsystem 204 may be configured to communicate with and receive a signal and/or data stream containing data representative of media content and/or data associated with media content (e.g., metadata, program guide data, etc.) from provider subsystem 202. Access subsystem 204 and provider subsystem 202 may communicate using any suitable communication technologies, devices, networks, media, and protocols supportive of remote data communications.

For example, as shown in FIG. 2, provider subsystem 202 may be configured to communicate with access subsystem 204 over a network 206 (and communications links thereto). Network 206 may include one or more networks or types of networks capable of carrying communications and/or data signals between provider subsystem 202 and access subsystem 204. For example, network 206 may include, but is not limited to, a subscriber television network, a provider-specific network (e.g., a Verizon® FIOS® network), a cable network, an optical fiber network, a hybrid fiber coax network, a wireless network (e.g., a Wi-Fi and/or mobile phone network), a satellite network, a wireless broadcast network (e.g., a satellite media broadcasting network or terrestrial broadcasting network), the Internet, an intranet, a local area network, any other suitable network, and any combination or sub-combination of these networks.

Provider subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection).

In some examples, provider subsystem 202 may be configured to generate or otherwise provide media content (e.g., one or more advertisements and/or media content instances available for purchase) to access subsystem 204. Access subsystem 204 may be configured to facilitate access by a user to media content received from provider subsystem 202. To this end, access subsystem 204 may present the media content for experiencing (e.g., viewing) by a user, record the media content, parse metadata and/or other data associated with the media content, facilitate purchase of access to the media content, etc.

Figure 3:
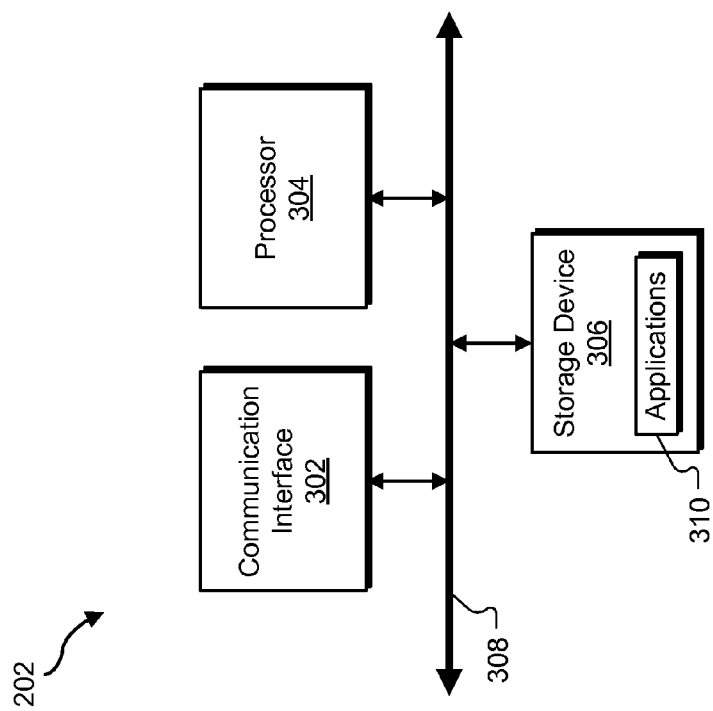
FIG. 3 illustrates exemplary components of a media content provider subsystem according to principles described herein.

FIG. 3 illustrates exemplary components of provider subsystem 202. As shown in FIG. 3, provider subsystem 202 may include a communication interface 302, a processor 304, and a storage device 306 communicatively coupled one to another via a communication infrastructure 308. The components of provider subsystem 202 may communicate with one another, including sending data to and receiving data from one another, using any suitable communication technologies. Moreover, the components of provider subsystem 202 may be implemented on any computing device or combination of computing devices, such as one or more servers, personal computers, or the like.

While an exemplary provider subsystem 202 is shown in FIG. 3, the components illustrated in FIG. 3 are not intended to be limiting. Additional or alternative components may be used in other embodiments. Components of the provider subsystem 202 shown in FIG. 3 will now be described in additional detail.

Communication interface 302 may be configured to communicate with one or more computing devices, including access subsystem 204. In particular, communication interface 302 may be configured to transmit and/or receive communication signals, media content, and/or data to/from access subsystem 204. Examples of communication interface 302 include, without limitation, a wired network interface (such as a network interface card), a wireless network interface (such as a wireless network interface card), a modem, and any other suitable interface. In at least one embodiment, communication interface 302 may provide a direct connection between provider subsystem 202 and access subsystem 204 via a direct link to a network, such as a subscriber television network and/or the Internet. Communication interface 302 may additionally or alternatively provide such a connection through, for example, a local area network (such as an Ethernet network), a personal area network, a telephone or cable network, a cellular telephone connection, a satellite data connection, or any other suitable connection.

In some examples, communication interface 302 may be configured to transmit (e.g., broadcast, multicast, and/or narrowcast) data representative of one or more media content instances to access subsystem 204. Such data may be transmitted in one or more media content data streams, as one or more data files, or in any other suitable manner as may serve a particular application. Communication interface 302 may be configured to interface with any suitable communication media, protocols, and formats, including any of those mentioned above.

Processor 304 generally represents any type or form of processing unit capable of processing data or interpreting, executing, and/or directing execution of one or more of the instructions, processes, and/or operations described herein. Processor 304 may direct execution of operations in accordance with one or more applications 310 or other computer-executable instructions such as may be stored in storage device 306 or another computer-readable medium. As an example, processor 304 may be configured to process data, including modulating, encoding, and/or otherwise preparing data (e.g., media content instance data and/or enhanced content data) for transmission by communication interface 302.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable applications 310 configured to direct processor 304 to perform any of the operations described herein may be stored within storage device 306. In some examples, data may be arranged in one or more databases residing within storage device 306.

In some examples, presentation facility 102, media content instance purchase facility 104, enhanced content facility 106, and/or storage facility 108 may be implemented by or within one or more components of provider subsystem 202. For example, one or more applications 310 residing within storage device 306 may be configured to direct processor 304 to perform one or more processes or functions associated with presentation facility 102, media content instance purchase facility 104, and/or enhanced content facility 106. Likewise, storage facility 108 may be implemented by or within storage device 306. For example, media content instance data 110, enhanced content data 112, and/or metadata data 114 may be stored within storage device 306.

Figure 4:
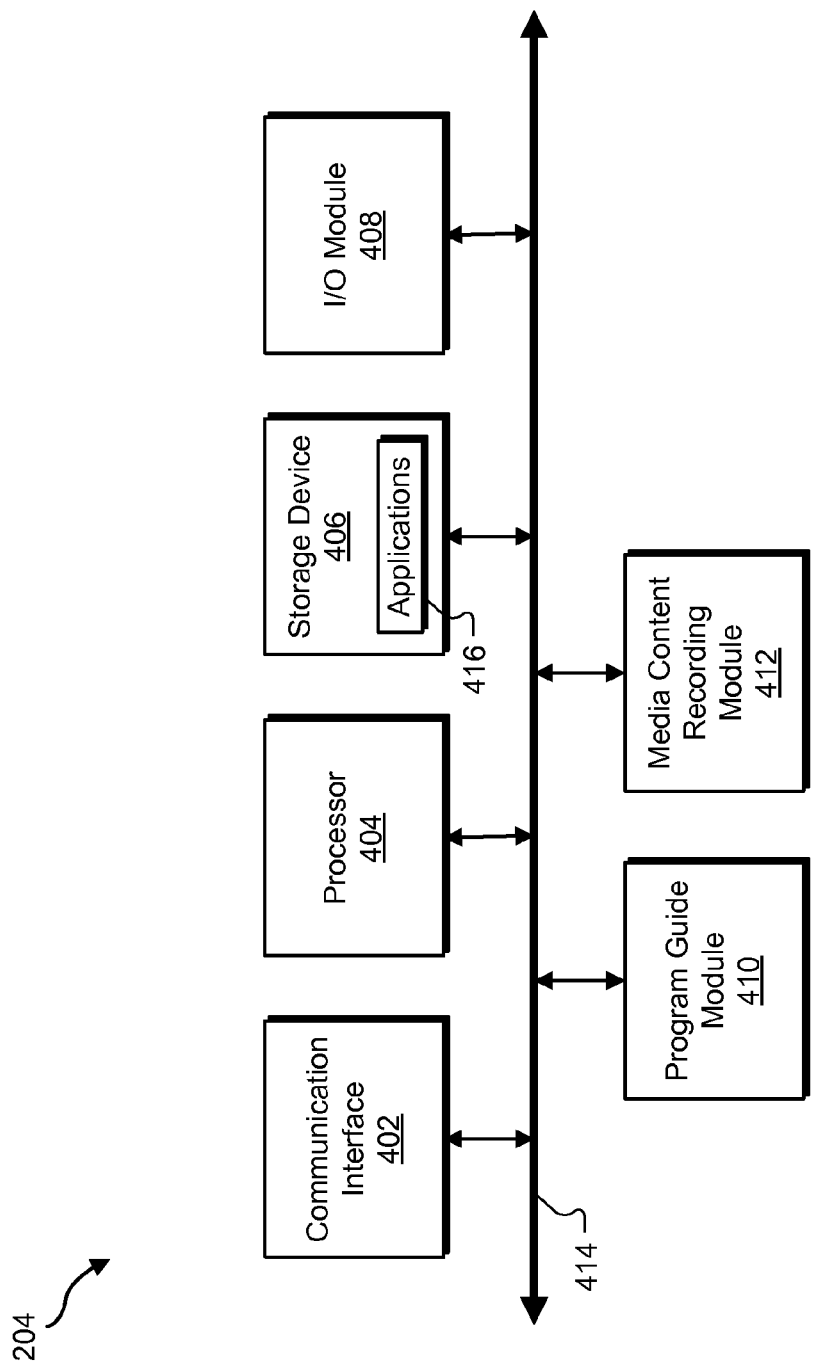
FIG. 4 illustrates exemplary components of a media content access subsystem according to principles described herein.

FIG. 4 illustrates exemplary components of access subsystem 204. As shown in FIG. 4, access subsystem 204 may include a communication interface 402, a processor 404, a storage device 406, an input/output ("I/O") module 408, a program guide module 410, and a media content recording module 412 communicatively coupled one to another via a communication infrastructure 414. The components of access subsystem 204 may communicate with one another, including sending data to and receiving data from one another, using any suitable communication technologies. Moreover, the components of access subsystem 204 may be implemented on any computing device or combination of computing devices, such as a set-top box device, a communications device, a mobile device (e.g., a mobile phone device), a handheld device, a personal computer, a phone device (e.g., Verizon Hub device), a personal-digital assistant device, gaming device, a television device, and/or any media content access device configured to perform one or more of the processes and/or operations described herein.

While an exemplary access subsystem 204 is shown in FIG. 4, the components illustrated in FIG. 4 are not intended to be limiting. Additional or alternative components may be used in other embodiments. Components of the access subsystem 202 shown in FIG. 4 will now be described in additional detail.

Communication interface 402 may be configured to communicate with one or more computing devices, including provider subsystem 202. In particular, communication interface 402 may be configured to transmit and/or receive communication signals, media content, and/or data to/from provider subsystem 202. Examples of communication interface 402 include, without limitation, a wired network interface (such as a network interface card), a wireless network interface (such as a wireless network interface card), a modem, and any other suitable interface. In at least one embodiment, communication interface 402 may provide a direct connection between provider subsystem 202 and access subsystem 204 via a direct link to a network, such as the Internet. Communication interface 402 may additionally or alternatively provide such a connection through, for example, a local area network (such as an Ethernet network), a personal area network, a telephone or cable network, a cellular telephone connection, a satellite data connection, or any other suitable connection.

As mentioned, provider subsystem 202 may transmit (e.g., broadcast, multicast, and/or narrowcast) data representative of one or more media content instances. Communication interface 402 may be configured to receive such data such that the data may be processed by access subsystem 204. To this end, communication interface 402 may include any device, logic, and/or other technologies suitable for receiving signals, data streams, and/or data representative of media content. Communication interface 402 may be configured to interface with any suitable communication media, protocols, and formats, including any of those mentioned above.

In certain embodiments, provider subsystem 202 may be configured to transmit and access subsystem 204 may be configured to receive data streams or signals including data representative of various media content instances in accordance with a transmission schedule. The transmission schedule may specify release times of various media content instances and that the particular media content instances are to be transmitted on certain media content carrier channels. The term "media content carrier channel" or simply "channel" as used herein may refer generally to any carrier of media content, including, but not limited to, media (e.g., television) channels, streams, addresses, frequencies or other carriers of media content.

Communication interface 402 may be configured to selectively identify, receive, and/or process appropriate data streams and/or media content instances at the scheduled release times and on the appropriate media content carrier channels. For instance, in certain implementations communication interface 402 may include a tuner configured to selectively receive media content carried on a particular media content carrier channel. The tuner may be tuned to a particular media content carrier channel such that the media content carried on the media content carrier channel is received and may be processed by access subsystem 204.

In some examples, communication interface 402 may include multiple tuners such that media content carried on different media content carrier channels may be concurrently received for processing by the access subsystem 204. For example, communication interface 402 may include a first tuner configured to receive media content carried on an analog video signal and a second tuner configured to concurrently receive media content carried on a digital compressed signal.

While one or more tuners may be used to receive various types of media content-carrying signals transmitted by provider subsystem 202, additionally or alternatively, communication interface 402 may be configured to receive other types of signals (e.g., other types of media content carrying signals) from provider subsystem 202 and/or one or more other sources without using a tuner. For example, provider subsystem 202 may transmit digital streams of data packets (e.g., Internet Protocol ("IP") based data packets) that can be received without using a tuner. For such types of signals, communication interface 402 may receive and forward the signals directly to other components of access subsystem 204 without the signals going through a tuner. For an IP-based signal, for example, communication interface 402 may function as an IP receiver.

Processor 404 generally represents any type or form of processing unit capable of processing data or interpreting, executing, and/or directing execution of one or more of the instructions, processes, and/or operations described herein. Processor 404 may direct execution of operations in accordance with one or more applications 416 or other computer-executable instructions such as may be stored in storage device 406 or another computer-readable medium. As an example, processor 404 may be configured to process data, including demodulating, decoding, and/or parsing data (e.g., data representative of media content received from provider subsystem 202 by communication interface 402), and encoding and modulating data for transmission by communication interface 402.

Storage device 406 may include one or more data storage media, devices, or configurations and may employ any type, form, and combination of data storage media and/or device. For example, storage device 406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 406. For example, data representative of one or more executable applications 416 configured to direct processor 404 to perform any of the operations described herein may be stored within storage device 406. In some examples, data may be arranged in one or more databases residing within storage device 406.

I/O module 408 may be configured to receive user input and provide user output and may include any hardware, firmware, software, or combination thereof supportive of input and output capabilities. For example, I/O module 408 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O module 408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 408 is configured to provide graphical data to a display for presentation to a user. The graphical data may representative of one or more graphical user interfaces ("GUIs"), GUI views, media content views, and/or any other view as may serve a particular application.

Program guide module 410 may be configured to maintain and operate on program guide data. As mentioned above, media content instances may be transmitted by provider subsystem 202 at scheduled transmission times and on certain media content carrier channels. To assist access subsystem 204 and/or a user of access subsystem 204 with reception of media content instances at appropriate scheduled transmission times and on appropriate media content carrier channels, program guide data may be received by communication interface 402 from provider subsystem 202 and/or from another source. The program guide data may be stored in storage device 406.

Media content recording module 412 may be configured to record data representative of media content to storage device 406. The recording of a media content instance is typically performed during a transmission time slot when data representative of the media content instance is received from provider subsystem 202 as described above. For example, during transmission of a media content instance from provider subsystem 202 to access subsystem 204 on a media content carrier channel, communication interface 402 may receive data representative of the media content instance on the media content carrier channel, and media content recording module 412 may direct that the received data representative of the media content instance be stored to storage device 406. Once stored, the data representative the media content instance may be accessed and processed as may suit a particular application, including providing data representative of the media content instance to a display for presentation to a user.

In some examples, presentation facility 102, media content instance purchase facility 104, enhanced content facility 106, and/or storage facility 108 may be implemented by or within one or more components of access subsystem 204. For example, one or more applications 416 residing within storage device 406 may be configured to direct processor 404 to perform one or more processes or functions associated with presentation facility 102, media content instance purchase facility 104, and/or enhanced content facility 106. Likewise, storage facility 108 may be implemented by or within storage device 406. For example, media content instance data 110, enhanced content data 112, and/or metadata data 114 may be stored within storage device 406.

Figure 5:
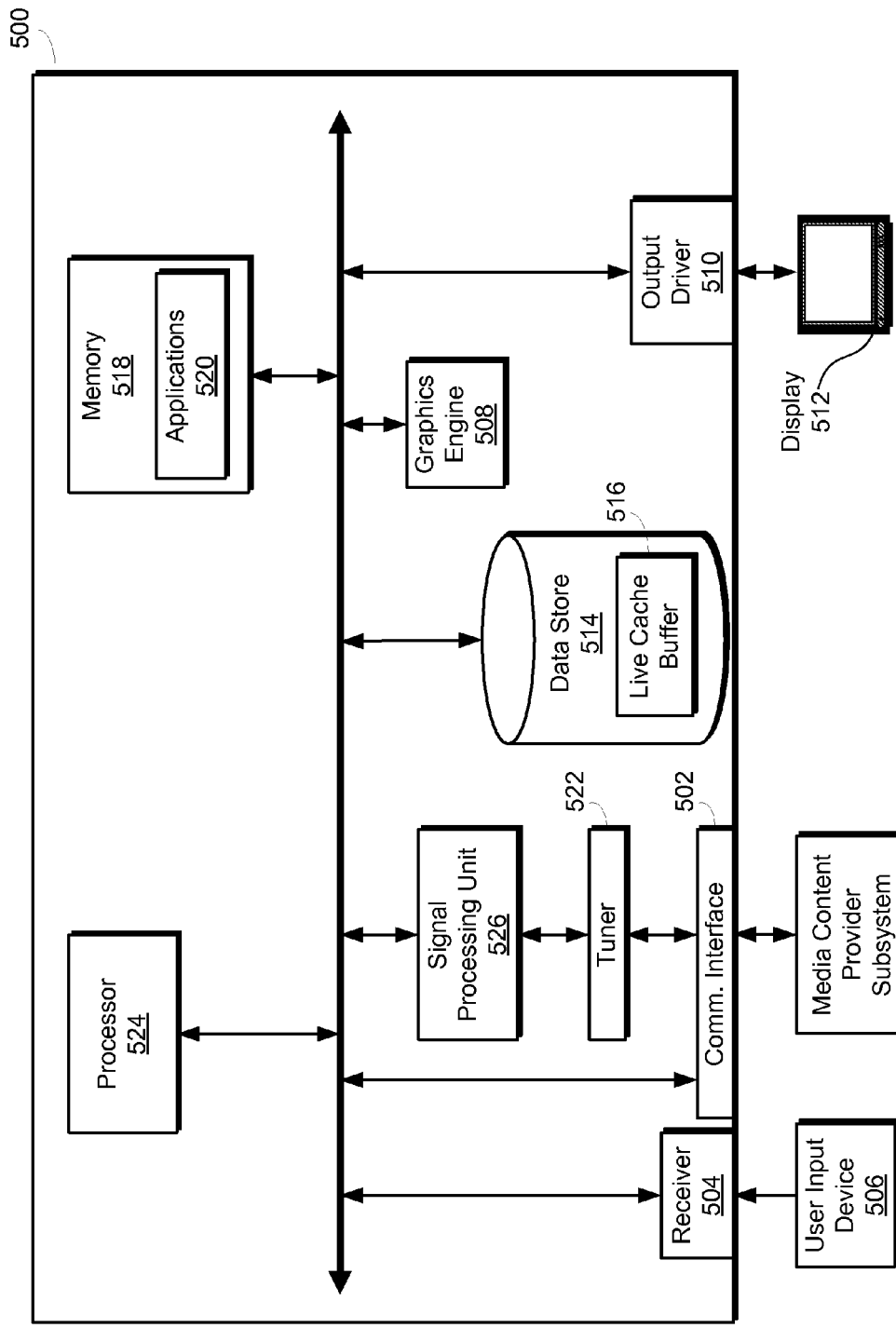
FIG. 5 illustrates an exemplary media content access device having the media content access subsystem of FIG. 4 implemented thereon according to principles described herein.

Access subsystem 204 and/or components of access subsystem 204 may be implemented as may suit a particular application. FIG. 5 illustrates an exemplary media content access device 500 (or simply "access device 500") having access subsystem 204 implemented thereon. Access device 500 may include one or more of the components of access subsystem 204 shown in FIG. 4 and may be configured to perform one or more of the processes and/or operations described herein. Access device 500 may include, but is not limited to, a set-top box device, a media content processing device, a communications device, a mobile device (e.g., a mobile phone device), a handheld device, a personal computer, a phone device (e.g., Verizon Hub device), a personal-digital assistant device, a gaming device, a digital video recording ("DVR") device, a television device, and/or any device configured to perform one or more of the processes and/or operations described herein.

As shown in FIG. 5, access device 500 may include a communication interface 502 configured to receive media content (e.g., one or more media content instances available for purchase and/or one or more advertisements) and/or data (e.g., metadata, program guide data, and/or any other data associated with media content) in any acceptable format from provider subsystem 202 or from any other suitable external source. Communication interface 502 may include any device, logic, and/or other technologies suitable for receiving signals and/or data representative of media content and/or other types of media content or data. Communication interface 502 may be configured to interface with any suitable communication media, protocols, and formats, including any of those mentioned above.

Access device 500 may also include a receiver 504 configured to receive user input signals from a user input device 506. User input device 506 may include, for example, a remote control device or any other suitable input device and may be configured to communicate with receiver 504 via a wireless link, electrical connection, or any other suitable communication link.

In some examples, access device 500 may include a graphics engine 508 and an output driver 510. Graphics engine 508 may be configured to generate graphics to be provided to output driver 510, which may be configured to interface with or drive a display 512. Output driver 510 may provide output signals to display 512, the output signals including graphical media content (e.g., media content and/or program guide media content) generated by graphics engine 508 and to be presented by display 512 for experiencing by a user. For example, output driver 510 may provide a data representative of a GUI including a program guide view to display 512 for presentation to the user. Graphics engine 508 and output driver 510 may include any combination of hardware, software, and/or firmware as may serve a particular application.

Data store 514 may include one or more data storage media, devices, or configurations and may employ any type, form, and combination of storage media. For example, data store 514 may include, but is not limited to, a hard drive, network drive, flash drive, magnetic disc, optical disc, or other non-volatile storage unit. Media content and/or data associated with media content may be temporarily and/or permanently stored in data store 514.

Data store 514 is shown to be included within access device 500 in FIG. 5 for illustrative purposes only. It will be understood that data store 514 may additionally or alternatively be located external to access device 500.

Data store 514 may include one or more live cache buffers 516. Live cache buffer 516 may additionally or alternatively reside in memory 518 or in a storage device external to access device 500. In some examples, media content data may be temporarily stored in live cache buffer 516 to facilitate viewing and/or recording of the media content.

Access device 500 may include memory 518. Memory 518 may include, but is not limited to, FLASH memory, random access memory ("RAM"), dynamic RAM ("DRAM"), other suitable computer-readable media, or any combination or sub-combination thereof. In some examples, one or more applications 520 configured to run on or otherwise be executed by access device 500 may reside in memory 518.

Access device 500 may include one or more tuners 522. Tuner 522 may be configured to selectively receive media content carried on a particular media content carrier channel such that the media content may be processed by access device 500. In some examples, media content received by tuner 522 may be temporarily buffered, or stored, in the live cache buffer 516. If there are multiple tuners 522, there may be a live cache buffer 516 corresponding to each of the tuners 522.

While tuner 522 may be used to receive certain media content-carrying signals transmitted by provider subsystem 202, access device 500 may be configured to receive other types of media content signals (including media content signals and/or program guide data signals) from provider subsystem 202 and/or one or more other sources without using a tuner. For example, provider subsystem 202 may transmit digital streams of data packets (e.g., Internet Protocol ("IP") based data packets) that can be received without using a tuner. For such types of media content signals, communication interface 502 may receive and forward the signals directly to other components of access device 500 (e.g., processor 524 or signal processing unit 526, described in more detail below) without the signals going through tuner 522. For an IP-based signal, for example, signal processing unit 526 may function as an IP receiver.

Access device 500 may include at least one processor, such as processor 524, configured to control and/or perform one or more operations of access device 500. Access device 500 may also include a signal processing unit 526 configured to process incoming media content. Signal processing unit 526 may be configured, for example, to demodulate and parse encoded digital media content. In some examples, access device 500 may include one or more signal processing units 526 corresponding to each of the tuners 522.

In some examples, provider subsystem 202 may be configured to support communication with access subsystem 204 via multiple network platforms. For example, a user may utilize multiple access devices 500, each associated with a different network platform, to access one or more applications and/or media content residing within provider subsystem 202.

Figure 6:
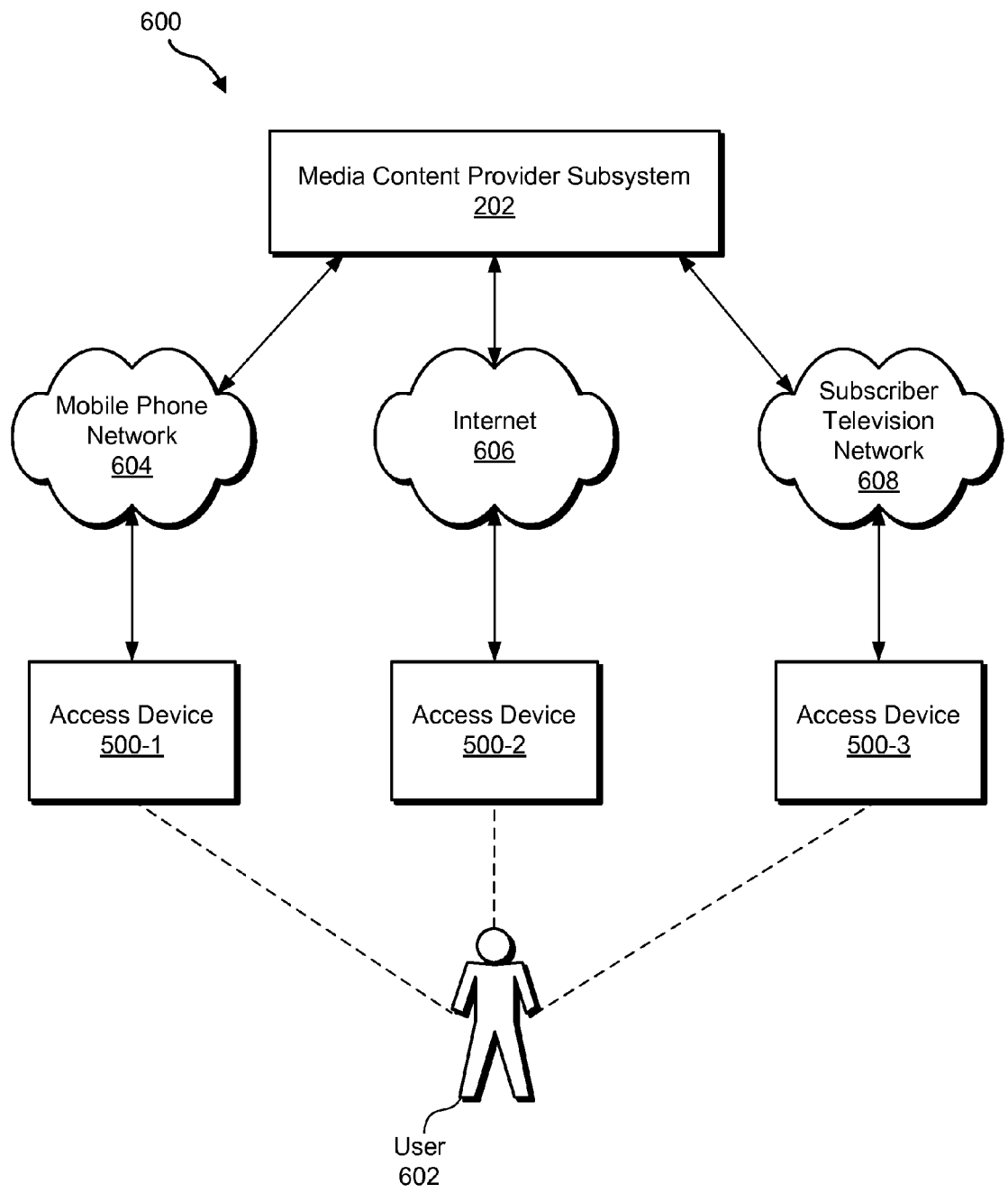
FIG. 6 shows another exemplary implementation of the system of FIG. 1 according to principles described herein.

To illustrate, FIG. 6 shows an exemplary implementation 600 of system 100. As shown in FIG. 6, implementation 600 may include provider subsystem 202 and access devices 500-1 through 500-3 (collectively referred to herein as "access devices 500") utilized by or otherwise associated with a user 602. Provider subsystem 202 may be configured to communicate with each access device 500 over a distinct network platform. For example, provider subsystem 202 may be configured to communicate with access device 500-1 (e.g., a mobile phone) over a mobile phone network 604, with access device 500-2 (e.g., a personal computer) over the Internet 606, and/or with access device 500-3 (e.g., a set-top box device) over a subscriber television network 608. Hence, user 602 may be able to utilize any of the access devices 500-1 through 500-3 to access one or more applications and/or media content residing within provider subsystem 202. It will be recognized that mobile phone network 604, the Internet 606, and subscriber television network 608 may be part of network 206 shown in FIG. 2. It will also be recognized that the networks shown in FIG. 6 are merely illustrative of the many different types of networks that may facilitate communication between provider subsystem 202 and access subsystem 204.

Figure 7:
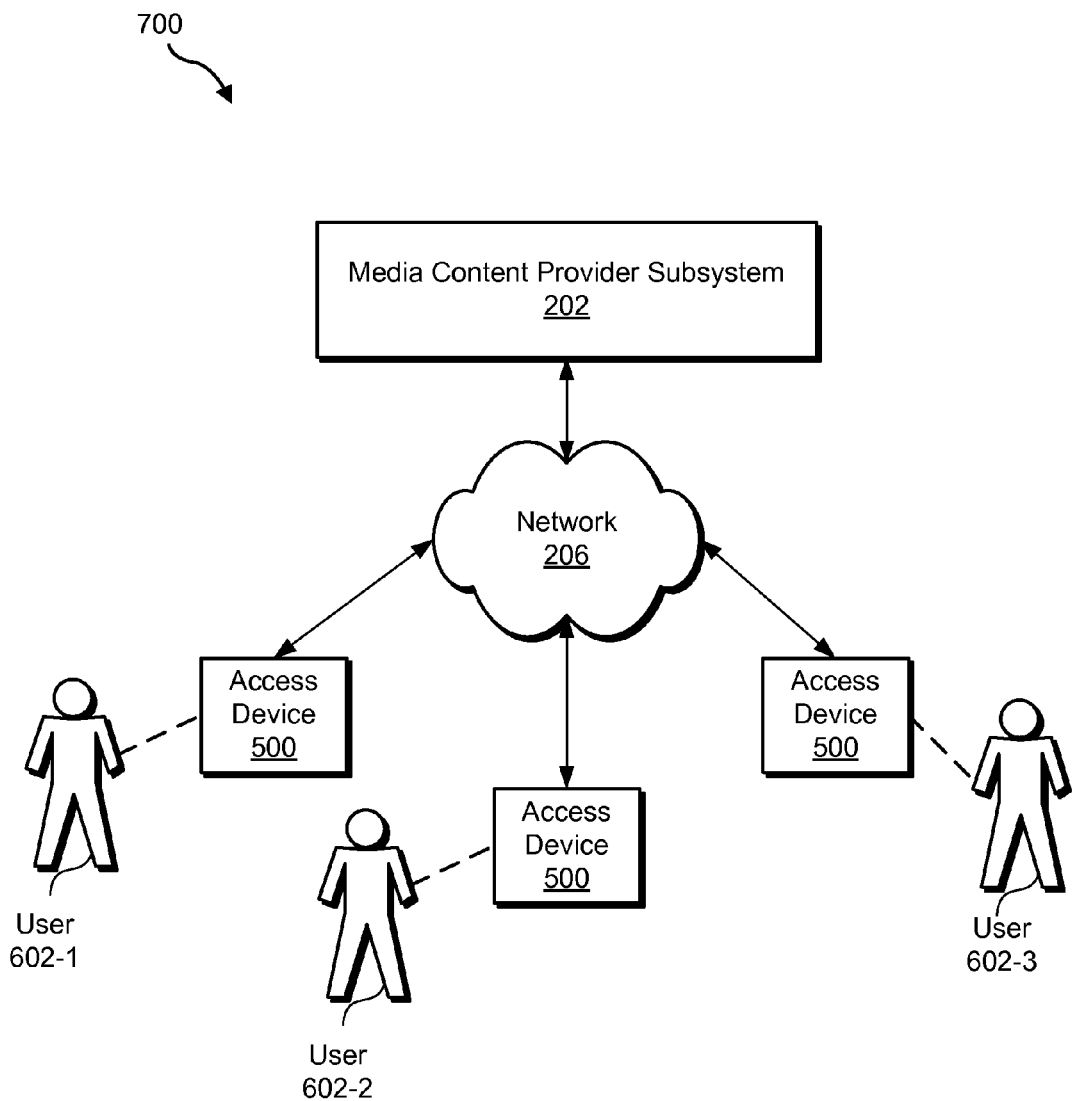
FIG. 7 shows another exemplary implementation of the system of FIG. 1 according to principles described herein.

System 100 may additionally or alternatively be configured to support interaction with multiple users. For example, FIG. 7 shows an exemplary implementation 700 of system 100 wherein multiple users 602 (e.g., users 602-1 through 602-3) may utilize one or more access devices 500 to communicate with provider subsystem 202 over network 206. As will be described in more detail below, enhanced content associated with a particular media content instance may be presented to multiple users 602 simultaneously.

As mentioned, media content instances available for purchase may be transmitted to a media content access device by way of some type of network (e.g., a subscriber television network). Hence, a user may wait until right before a release time of a particular media content instance to purchase access to the media content instance. For this reason, the user may not have any incentive to pre-order a media content instance (i.e., purchase access to the media content instance prior to a release time of the media content instance).

The methods and systems described herein are configured to incentivize pre-ordering of a media content instance available for purchase by allowing a user to access enhanced content associated with a purchased media content instance before a release time of the purchased media content instance. The user may additionally interact with the enhanced content during and/or after a presentation of the purchased media content instance by access subsystem 204. By being able to access enhanced content before, during, and after a presentation of a media content instance, the user may be more willing to pre-order the media content instance and/or purchase the media content instance through a particular content provider (e.g., through a subscriber television provider as opposed to through an online or retail store.)

Figure 8:
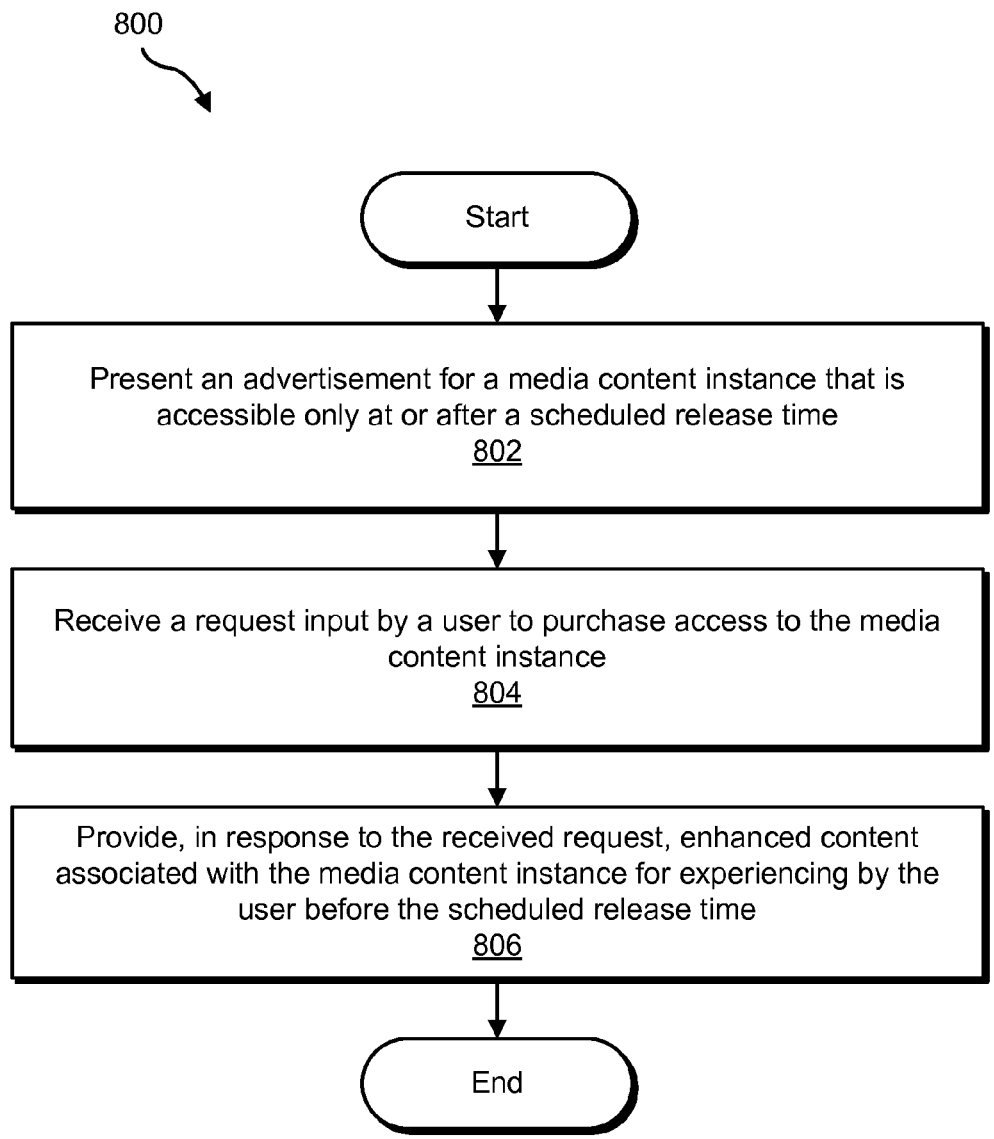
FIG. 8 illustrates an exemplary method of providing enhanced content associated with a media content instance available for purchase according to principles described herein.

FIG. 8 illustrates an exemplary method 800 of providing enhanced content associated with a media content instance available for purchase. While FIG. 8 illustrates exemplary steps according to one embodiment, other embodiments may omit, add to, reorder, and/or modify any of the steps shown in FIG. 8. One or more steps of method 800 may be performed by media content delivery system 100 and/or any facility, component, or device thereof.

In step 802, an advertisement for a media content instance that is accessible only at or after a scheduled release time is presented. The advertisement may be presented by presentation facility 102, for example, in any of the ways described herein.

Figure 9:
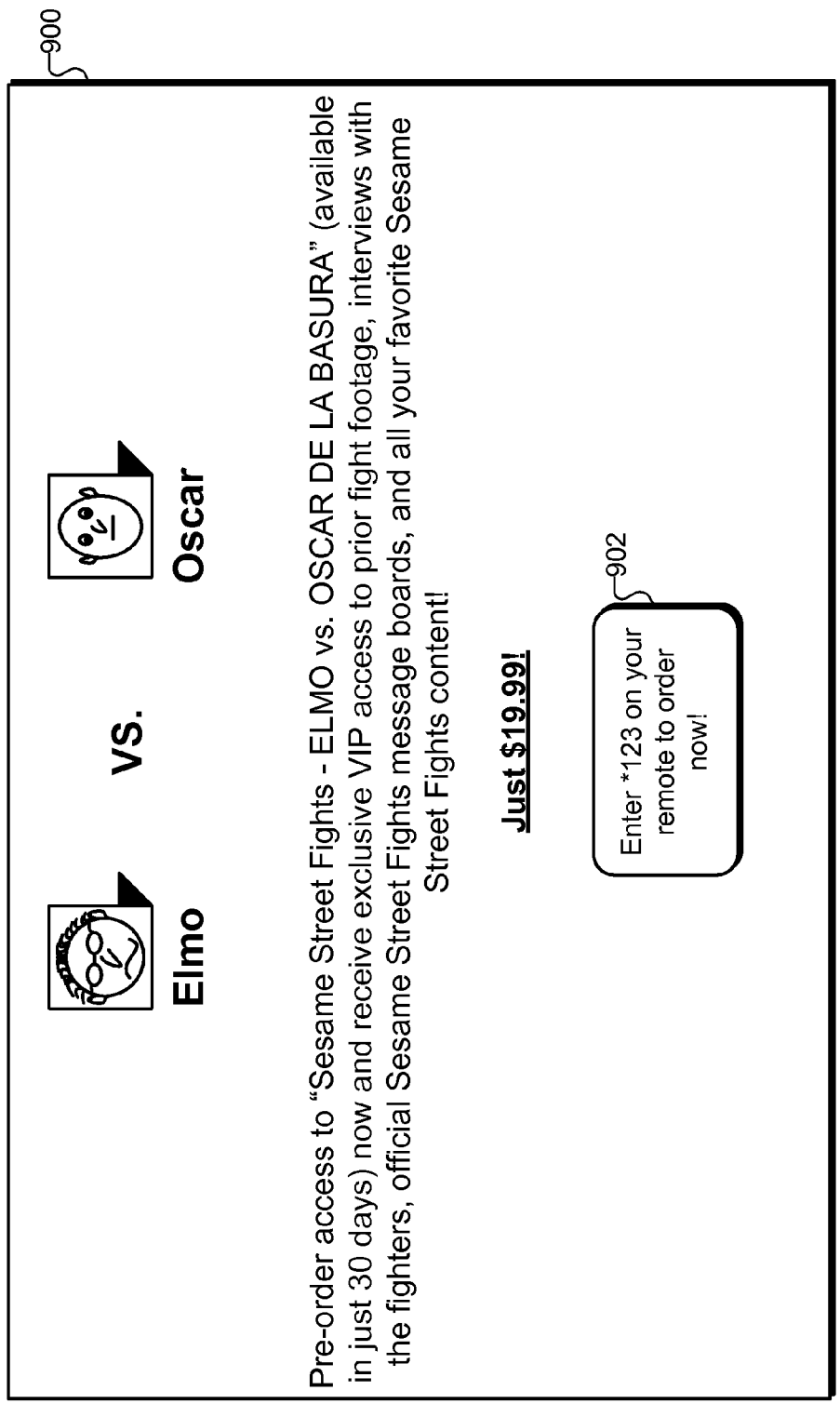
FIG. 9 shows an exemplary advertisement frame that may be included within a visual advertisement presented to a user of an access subsystem according to principles described herein.

For example, the advertisement may be included within a broadcast advertisement stream that is presented to the user by way of access subsystem 204. To illustrate, FIG. 9 shows an exemplary advertisement frame that may be included within a visual advertisement presented to a user of access subsystem 204. As shown in FIG. 9, advertisement frame 900 may be configured to advertise a particular media content instance available for purchase. In the example of FIG. 9, advertisement frame 900 is advertising a pay-per-view event entitled "Sesame Street fights—Elmo vs. Oscar De La Basura". As shown in advertisement frame 900, the pay-per-view event is scheduled to be broadcast thirty days from the date of presentation of the advertisement.

Advertisement frame 900 may be further configured to display information 902 that directs a viewer of advertisement frame 902 to press a sequence of input buttons on a remote control or the like in order to purchase access to the pay-per-view event. In some examples, instructions 902 may be specific to a particular subscriber television network (e.g., the Verizon® FIOS® network) such that only users of the particular subscriber television network may purchase the pay-per-view event by pressing the displayed sequence of input buttons. Alternatively, instructions 902 may be applicable to a user of any subscriber network.

In some alternative examples, instructions 902 may include a hyperlink or other enhanced content trigger that may be selected by a user in order to submit a request to purchase access to the pay-per-view event. Selection of the hyperlink may automatically purchase access to the pay-per-view event if a purchase account associated with the user has been pre-established. Alternatively, selection of the hyperlink may direct the user to a portal in which the user may input credit card information or the like in order to purchase access to the pay-per-view event. In some examples, the hyperlink or other enhanced content trigger may be transmitted to access subsystem 204 independent of the broadcast advertisement stream. For example, the hyperlink or other enhanced content trigger may be transmitted by way of an IP network or the like.

Figure 10:
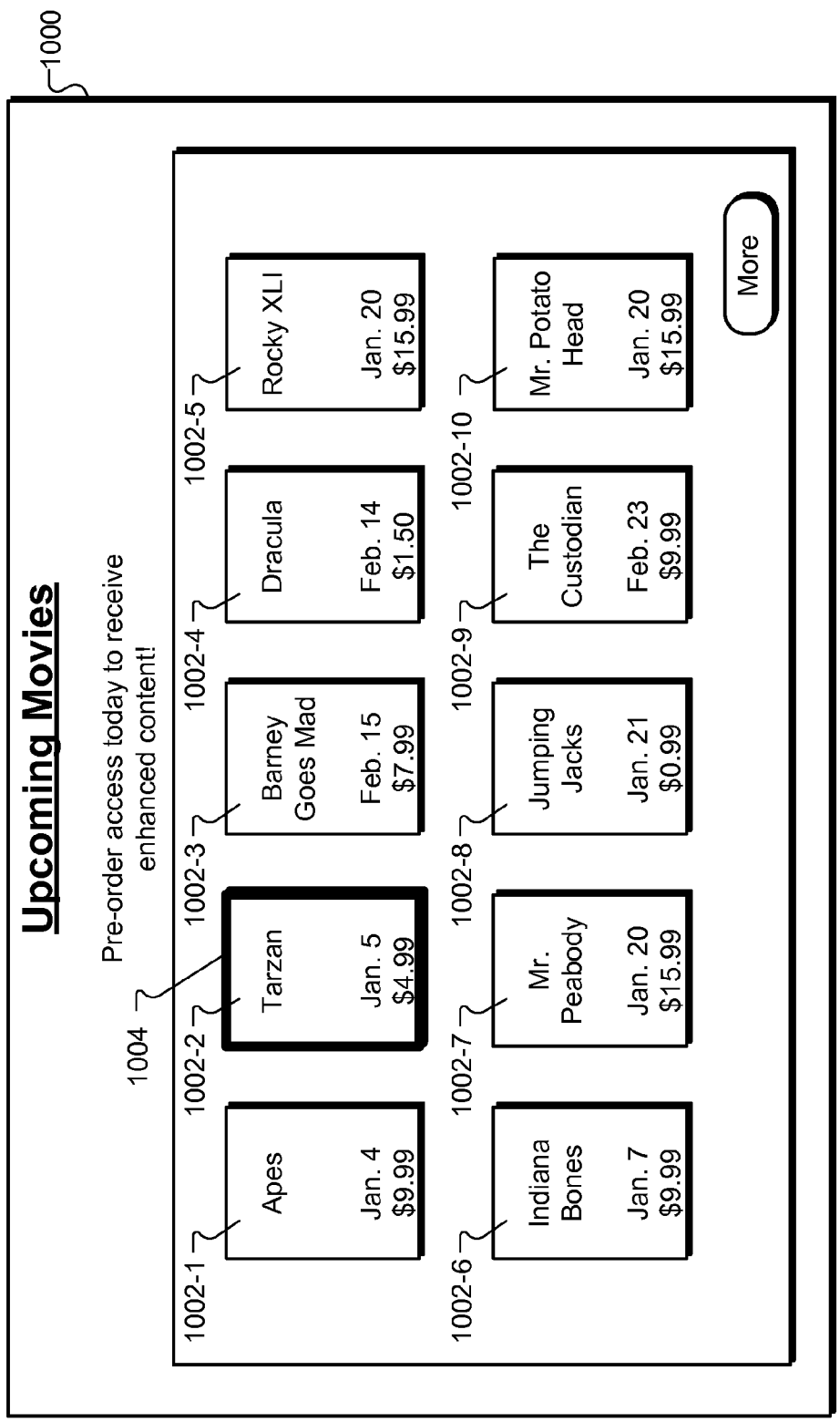
FIG. 10 illustrates an alternative form of presenting an advertisement for a media content instance available for purchase to a user of an access subsystem according to principles described herein.

FIG. 10 illustrates an alternative form of presenting an advertisement for a media content instance available for purchase to a user of access subsystem 204. As shown in FIG. 10, a GUI 1000 including an advertisement for one or more media content instances available for purchase may be presented to a user of access subsystem 204. GUI 1000 may be displayed on a display device (e.g., a television) included within access subsystem 204.

GUI 1000 may be configured to display a listing of media content instances available for purchase by way of access subsystem 204. The listing of available media content instances may be presented within an interactive program guide, an interactive menu hierarchy, and/or any other type of GUI as may serve a particular application. In the particular example illustrated in FIG. 10, GUI 1000 includes a plurality of graphical objects 1002 (e.g., graphical objects 1002-1 through graphical object 1002-10) each representative of a movie available for purchase. For example, graphical object 1002-1 represents a movie entitled "Apes" scheduled for release on January 4, graphical object 1002-2 represents a movie entitled "Tarzan" scheduled for release on January 5, and graphical object 1002-10 represents a movie entitled "Mr. Potato Head" scheduled for release on January 20.

A user may purchase access to one of the movies represented by graphical objects 1002 by positioning a selection box 1004 over the desired graphical object (e.g., graphical object 1002-2). With the selection box 1004 appropriately positioned, the user may press a "select" button or the like on a remote control device to purchase access to the corresponding movie. To illustrate, a user may purchase access to "Tarzan" by positioning selection box 1004 over graphical object 1002-2, as shown in FIG. 10, and pressing a "select" button on a remote control device.

Returning to FIG. 8, in step 804, a request input by a user to purchase access to the media content instance advertised in step 802 is received. The request may be received and processed by media content instance purchase facility 104, for example, in any of the ways described herein.

In response to the received request, as shown in step 806, enhanced content associated with the media content instance is provided for experiencing by the user before the scheduled release time. The enhanced content may be provided by enhanced content facility 106, for example, in any of the ways described herein.

Figure 11:
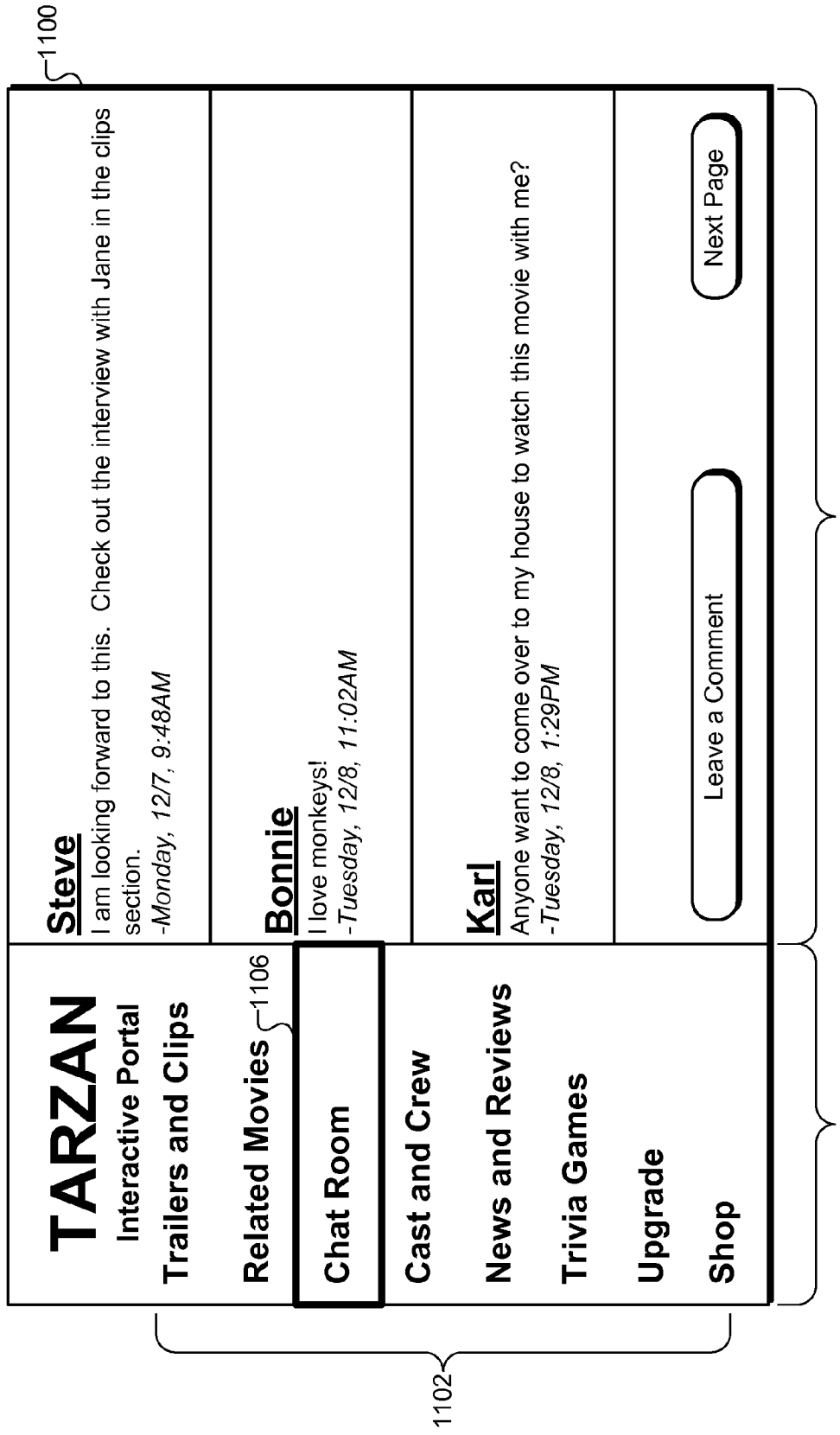
FIG. 11 shows an exemplary interactive portal that may be configured to present enhanced content associated with a purchased media content instance according to principles described herein.

In some examples, enhanced content associated with a purchased media content instance may be provided to a user within an interactive portal configured to facilitate interaction by the user with the enhanced content. To illustrate, FIG. 11 shows an exemplary interactive portal 1100 that may be presented to a user who has purchased access to the "Tarzan" movie represented by graphical object 1002-2 in FIG. 10. It will be recognized that interactive portal 1100 shown in FIG. 11 is merely illustrative of the many different interactive portals and/or other means by which enhanced content associated with a media content instance purchased by a user may be presented to the user.

As shown in FIG. 11, interactive portal 1100 may be configured to present various types of enhanced content associated with a purchased media content instance (e.g., the movie "Tarzan"). For example, the enhanced content may be organized within a plurality of selectable enhanced content categories 1102, a list of which may be displayed within a viewing pane (e.g., viewing pane 1104) of interactive portal 1100. As shown in FIG. 11, exemplary enhanced content categories 1102 include, but are not limited to, trailers and clips, related movies, social networking content (e.g., chat rooms), cast and crew content, news and reviews, trivia games, upgrade content, and shopping content. Additional or alternative enhance content categories 1102 may be displayed within interactive portal 1100 as may serve a particular application. For example, a user and/or a vendor may specify which enhanced content categories are displayed within interactive portal 1100.

To access enhanced content included within one of the enhance content categories 1102, a user may position a selector box 1106 over the desired category. In response, enhanced content included within the selected category may be presented within another viewing pane (e.g., viewing pane 1108). For example, as shown in FIG. 11, selector box 1106 is positioned over an enhanced content category labeled "chat room". Hence, an interactive chat room is displayed within viewing pane 1108. The user may utilize the interactive chat room to discuss "Tarzan" with other fans of the movie, receive recommendations from other users, access user generated content, meet other fans of "Tarzan" in person, and/or otherwise interact socially with other users who have purchased access to the "Tarzan" movie.

Figure 12:
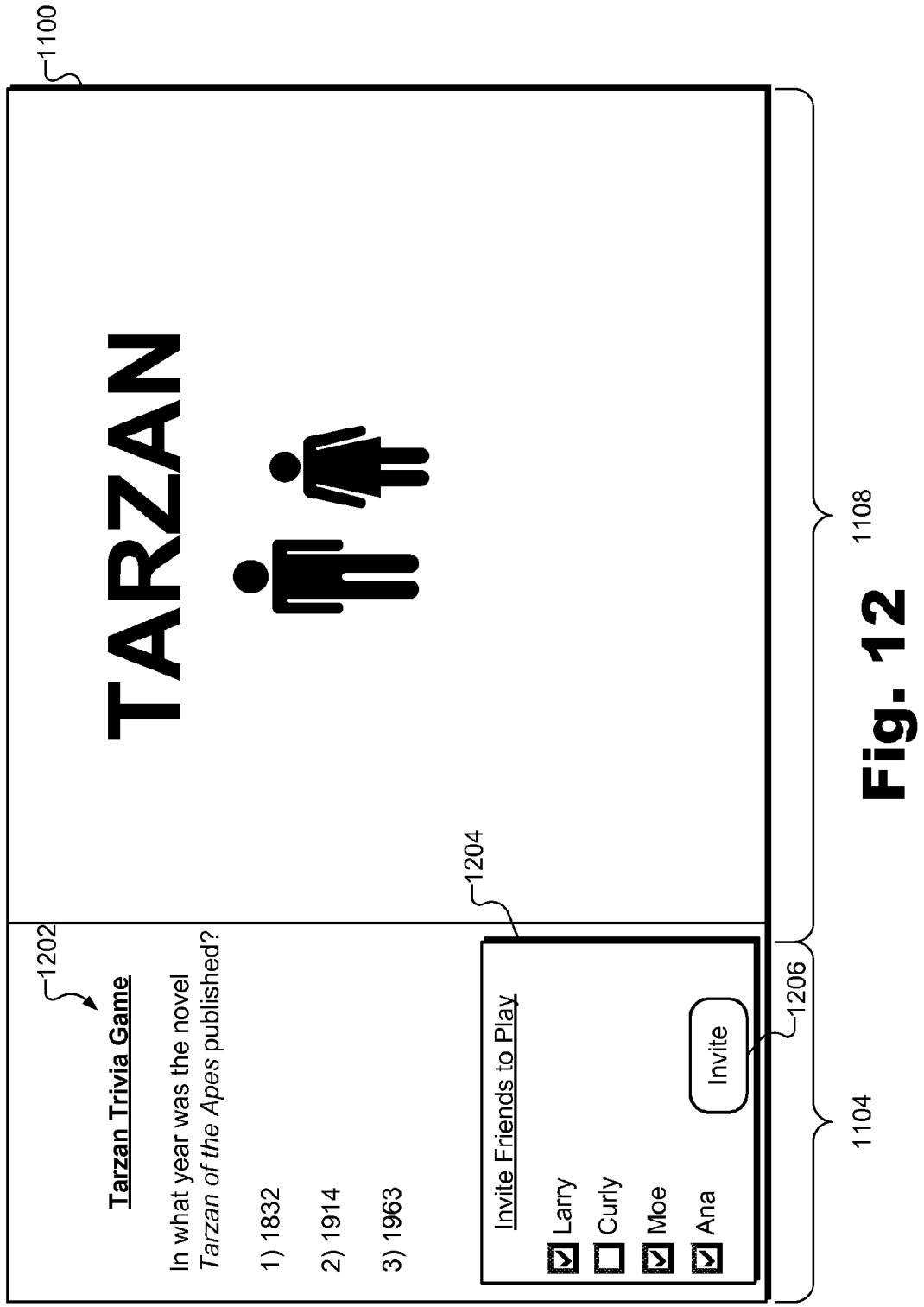
FIG. 12 illustrates an exemplary configuration wherein a media content instance and enhanced content associated with the media content instance are concurrently displayed according to principles described herein.

In some examples, system 100 may be configured to provide access to enhanced content associated with a purchased media content instance concurrently with a presentation of the media content instance by access subsystem 204. For example, a user may select the "trivia games" category shown in FIG. 11 to participate in an interactive trivia game associated with "Tarzan" while the movie is being presented to the user. In response, as shown in FIG. 12, an interactive trivia game 1202 may be displayed within viewing pane 1104 while "Tarzan" is presented in viewing pane 1108.

In some examples, a user participating in trivia game 1202 may desire to invite one or more additional users to participate in (e.g., join) the interactive trivia game 1202. To this end, a list of friends or other users who have purchased access to "Tarzan" may be presented to the user in a pop-up box 1204. The user may select one or more of the users displayed within pop-up box 1204 to and an invite button 1206 to invite those users to participate in the interactive trivia game 1202. The list of users displayed within pop-up box 1204 may be selected from a group of users designated as friends or contacts of the user of access subsystem 204 or from any other group of users (e.g., unknown users) as may serve a particular application.

In some alternative examples, enhanced content and a purchased media content instance may be concurrently presented to a user by being displayed on separate display screens. For example, FIG. 13 illustrates an exemplary configuration wherein a media content instance (e.g., "Tarzan") and interactive trivia game 1202 are concurrently displayed on distinct display screens 1300 and 1302, respectively. Display screen 1300 may be associated with a set-top box device and display screen 1302 may be a part of a mobile phone device 1304 or other type of access device.

In some examples, a user may access enhanced content associated with a media content instance after the release time of the media content instance. Access to enhanced content after the release time of the media content instance may garner further interest in the media content instance and/or encourage users to not delay in purchasing access to the media content instance.

Figure 14:
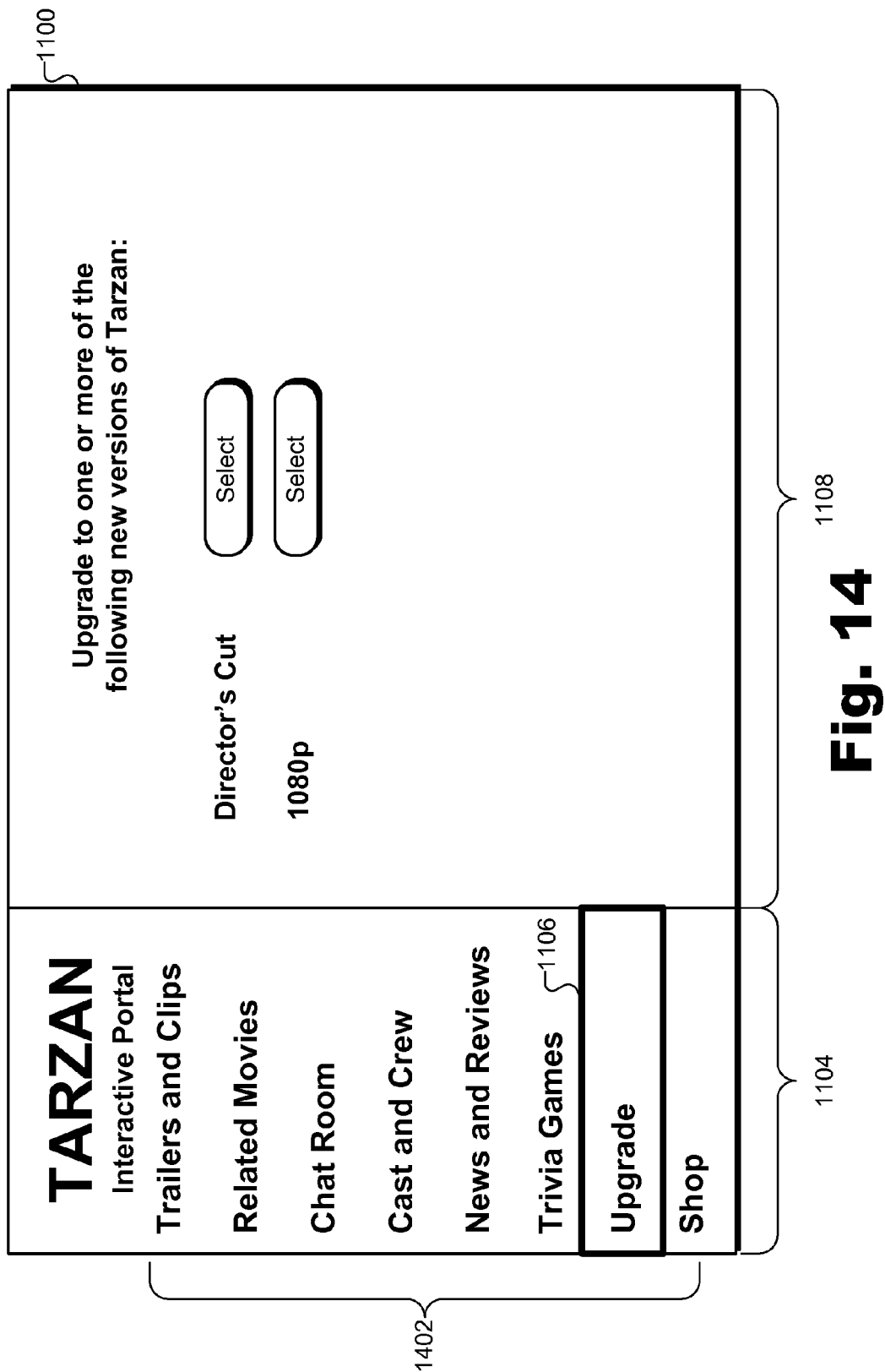
FIG. 14 illustrates a particular view of the interactive portal of FIG. 11 wherein a user has accessed upgrade options included within an "upgrade" category associated with a media content instance according to principles described herein.

For example, FIG. 14 illustrates a particular view of interactive portal 1100 in which a user has accessed upgrade options included within an "upgrade" category associated with "Tarzan". As shown in FIG. 14, various upgrade options associated with "Tarzan" may be presented within the interactive portal 1100. For example, a user may utilize interactive portal 1100 to access a director's cut and/or a higher resolution version (e.g. 1080p) of the movie after the initial release date of the movie. In some examples, the upgrade options may be provided to the user free of charge or at a discount to the user in order to incentivize a user to not wait until such versions are available in order to purchase access to a media content instance.

The foregoing examples of enhanced content associated with a purchased media content instance are merely illustrative of the many different types of enhanced content that may be provided to a user. Other types of enhanced content, such as any of the enhanced content described herein, may be presented to the user as may serve a particular application.

In some examples, system 100 may provide one or more application programming interfaces configured to facilitate customization of interactive portal 1100 to a vendor associated with a purchased media content instance and/or enhanced content displayed within interactive portal 1100. The vendor may utilize the APIs to provide input configured to customize the contents of the interactive portal 1100. For example, a vendor may be provided with an option of updating enhanced content included within one or more of the enhanced content categories 1102 and/or otherwise customizing the appearance or contents of the interactive portal 1100.

Additionally or alternatively, the contents of interactive portal 1100 may be automatically generated. For example, interactive portal 1100 may include links to web content or the like. When the web content is updated, the contents of interactive portal 1100 may be automatically updated. System 100 may additionally or alternatively be configured to automatically update and/or select the enhanced content to be included within interactive portal 1100 in accordance with a current time in relation to the release time of the media content instance, a user profile associated with the user, a mood of the user, and/or any other factor as may serve a particular application.

In some examples, various aspects of the interactive portal may be fixed such that they are not customizable by a vendor. For example, a general layout of interactive portal 1100 may be fixed in order to convey a consistent look and feel across different interactive portals 1100 associated with different media content instances.

In some examples, enhanced content associated with a purchased media content instance may be presented to the user by way of a custom media content channel. Additionally or alternatively, the enhanced content may be presented to a user by way of an application executed by one or more components of system 100. For example, an application residing within a set-top box device or other access device 500 may be executed by the set-top box in order to present the enhanced content to the user.

Figure 15:
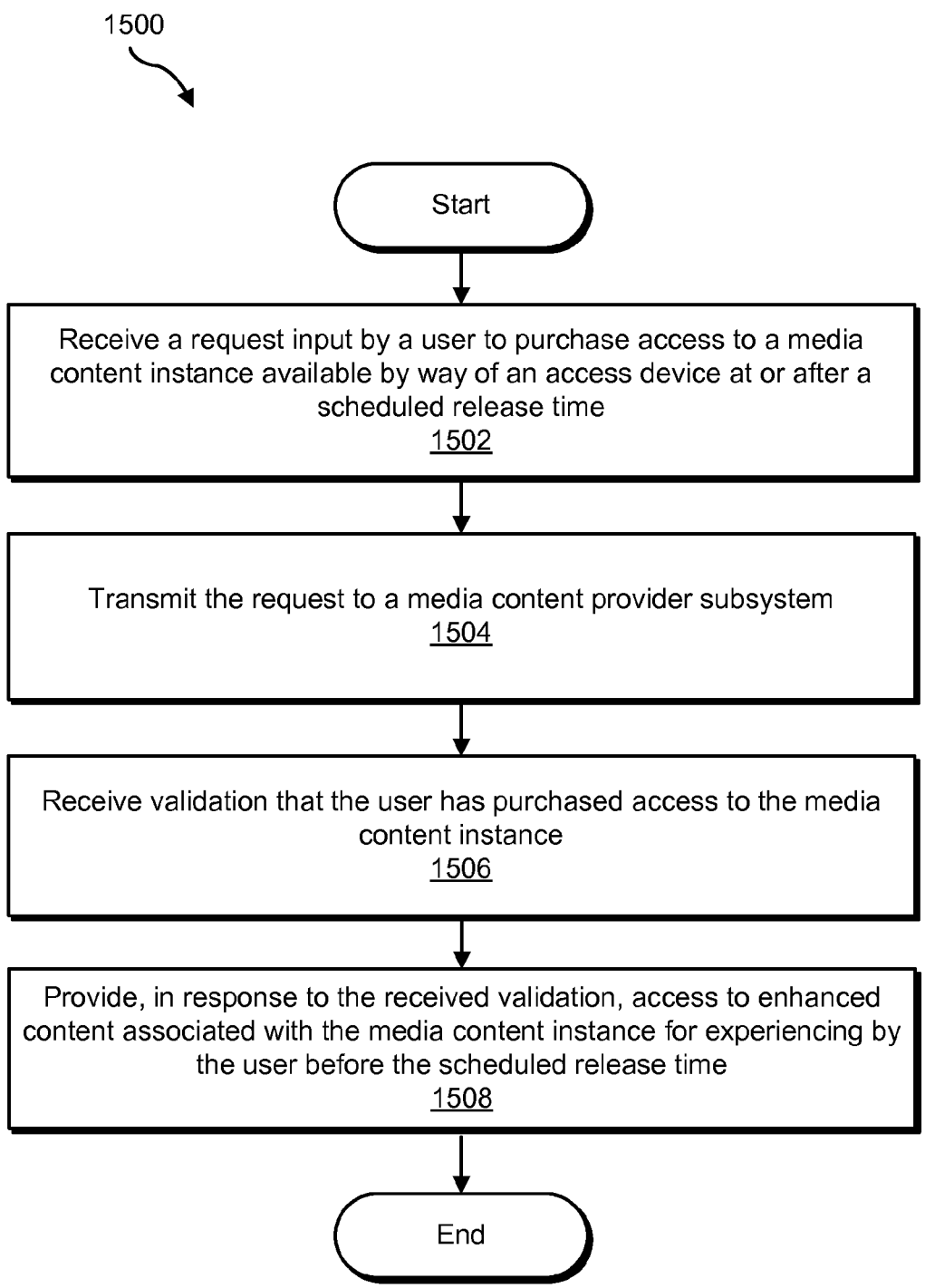
FIG. 15 illustrates another exemplary method of providing enhanced content associated with a media content instance available for purchase according to principles described herein.

FIG. 15 illustrates another exemplary method 1500 of providing enhanced content associated with a media content instance available for purchase. While FIG. 15 illustrates exemplary steps according to one embodiment, other embodiments may omit, add to, reorder, and/or modify any of the steps shown in FIG. 15. One or more steps of method 1500 may be performed by an access device (e.g., access device 500).

In step 1502, an access device receives a request input by a user to purchase access to a media content instance available by way of the access device at or after a scheduled release time. The access device may receive the request in any of the ways described herein.

In step 1504, the access device transmits the request to a media content provider subsystem (e.g., media content provider subsystem 202). The media content provider subsystem may process the request and provide validation to the access device that the user has successfully purchased access to the media content instance.

In step 1506, the access device receives validation from the media content provider subsystem that the user has purchased access to the media content instance. The validation may be received in any suitable manner as may serve a particular application.

In step 1508, the access device provides, in response to the received validation, access to enhanced content associated with the media content instance for experiencing by the user before the scheduled release time. The access device may provide access to the enhanced content in any of the ways described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:
1. A method comprising:
presenting, by a media content delivery system, prior to a scheduled release time of a media content instance, an advertisement to pre-order the media content instance by way of a subscriber television network;
receiving, by the media content delivery system in response to the advertisement, a request input by a user to pre-order the media content instance by way of the subscriber television network; and
providing, by the media content delivery system in response to the received request to pre-order the media content instance by way of the subscriber television network, enhanced content associated with the media content instance for experiencing by the user by way of the subscriber television network before the scheduled release time, the enhanced content being exclusively accessible to users who have pre-ordered the media content instance by way of the subscriber television network.

2. The method of claim 1, further comprising displaying, by the media content delivery system, an interactive portal configured to facilitate interaction by the user with the enhanced content.

3. The method of claim 2, further comprising:
providing, by the media content delivery system, one or more application programming interfaces configured to facilitate customization of the interactive portal to a vendor associated with at least one of the media content instance and the enhanced content; and
customizing, by the media content delivery system, the interactive portal in accordance with input provided by the vendor.

4. The method of claim 1, further comprising providing, by the media content delivery system, access to the enhanced content by the user after the scheduled release time of the media content instance.

5. The method of claim 1, further comprising providing, by the media content delivery system, access to the enhanced content by the user concurrently with a presentation of the media content instance.

6. The method of claim 1, wherein the advertisement is included within a broadcast advertisement stream.

7. The method of claim 1, wherein the advertisement is included within a listing of available media content instances displayed by the media content delivery system.

8. The method of claim 1, further comprising dynamically updating, by the media content delivery system, the enhanced content based on an interaction of the user with the enhanced content.

9. The method of claim 1, wherein the media content instance and the enhanced content are only accessible by way of the subscriber television network.

10. The method of claim 1, wherein the enhanced content comprises at least one of social networking content associated with the media content instance, Internet-based content associated with the media content instance, content associated with personnel associated with the media content instance, rating content associated with the media content instance, one or more scenes included within the media content instance, production content associated with the media content instance, one or more scenes deleted from the media content instance, one or more alternative scenes associated with the media content instance, trivia associated with the media content instance, one or more advertisements for one or more objects associated with the media content instance, and one or more platform-specific formats of the media content instance.

11. The method of claim 1, wherein the media content instance comprises at least one of a movie, a video-on-demand program, a pay-per-view event, a live broadcast of an event, and a song.

12. The method of claim 1, embodied as computer-executable instructions on at least one non-transitory computer-readable medium.

13. A method comprising:
receiving, by an access device, prior to a scheduled release time of a media content instance, a request input by a user to pre-order the media content instance available by way of a subscriber television network;
transmitting, by the access device, the request to a media content provider subsystem;
receiving from the media content provider subsystem, by the access device, validation that the user has pre-ordered the media content instance by way of the subscriber television network; and
providing, by the access device in response to the validation that the user has pre-ordered the media content instance by way of the subscriber television network, access to enhanced content associated with the media content instance for experiencing by the user by way of the subscriber television network before the scheduled release time, the enhanced content being exclusively accessible to users who have pre-ordered the media content instance by way of the subscriber television network.

14. The method of claim 13, further comprising displaying, by the access device, an interactive portal configured to facilitate interaction by the user with the enhanced content.

15. The method of claim 13, further comprising providing, by the access device, access to the enhanced content by the user after the scheduled release time of the media content instance.

16. The method of claim 13, further comprising providing, by the access device, access to the enhanced content by the user concurrently with a presentation of the media content instance.

17. A system comprising:
a presentation facility configured to present an advertisement by way of a subscriber television network for a media content instance prior to a scheduled release time of the media content instance;
a media content instance purchase facility configured to receive and process, prior to the scheduled release time of the media content instance, a request input by a user in response to the advertisement to pre-order the media content instance by way of the subscriber television network; and
an enhanced content facility configured to provide, in response to the received request to pre-order the media content instance by way of the subscriber television network, enhanced content associated with the media content instance for experiencing by the user by way of the subscriber television network before the scheduled release time, the enhanced content being exclusively accessible to users who have pre-ordered the media content instance by way of the subscriber television network.

18. The system of claim 17, wherein the enhanced content facility is further configured to direct presentation facility to present an interactive portal configured to facilitate interaction by the user with the enhanced content.

19. The system of claim 18, wherein the enhanced content facility is further configured to:
provide one or more application programming interfaces configured to facilitate customization of the interactive portal to a vendor associated with at least one of the media content instance and the enhanced content; and
customize the interactive portal in accordance with input provided by the vendor.

20. The system of claim 17, wherein the enhanced content facility is further configured to provide access to the enhanced content by the user after the scheduled release time of the media content instance.

* * * * *